United States Patent [19]
DiGiacomo et al.

[11] Patent Number: 5,851,027
[45] Date of Patent: Dec. 22, 1998

[54] VARIABLE OUTPUT DRIVER SIDE HYBRID INFLATOR

[75] Inventors: Michael DiGiacomo; Stephen Gold, both of Warrenton, Va.; Richard Husband, Farragut, Tenn.; Robert Bishop, Sterling Heights, Mich.; Chester Copperthite, Manassas, Va.; Charles Woods, East Camden, Ark.

[73] Assignee: Bendix-Atlantic Inflator Company, Knoxville, Tenn.

[21] Appl. No.: 711,028

[22] Filed: Sep. 9, 1996

[51] Int. Cl.⁶ ..................................................... B60R 21/16
[52] U.S. Cl. ............................................. 280/736; 280/741
[58] Field of Search ...................... 280/736, 737, 280/741, 742

[56] References Cited

U.S. PATENT DOCUMENTS

| | | | |
|---|---|---|---|
| 4,131,300 | 12/1978 | Radke et al. ............................ | 280/737 |
| 5,199,740 | 4/1993 | Frantom et al. ......................... | 280/736 |
| 5,423,570 | 6/1995 | Kort et al. .............................. | 280/736 |
| 5,516,147 | 5/1996 | Clark et al. ............................. | 280/737 |
| 5,584,505 | 12/1996 | O'Looughlin et al. ................. | 280/737 |

*Primary Examiner*—Kenneth R. Rice
*Attorney, Agent, or Firm*—Sixbey, Friedman Leedom & Ferguson; Frank P. Presta; Joseph S. Presta

[57] ABSTRACT

A variable output inflator (20) for use in inflating an air bag or air cushion comprising: a pressure vessel (22) comprising a thin walled toroidal pressure vessel portion (23) and a cylindrical pressure vessel portion (60) circumscribed by, in physical contact and in fluid communication with the toroidal pressure vessel portion, the cylindrical pressure vessel portion including a rupturable disk (74) and at least one exit port (78) communicable with an air bag; a pyrotechnic member (200a,b) for heating stored inflation gas within the pressure vessel to a pressure level to rupture the rupturable disk, allowing heated inflation gas to exit and fill an adjacently attached air bag.

19 Claims, 10 Drawing Sheets

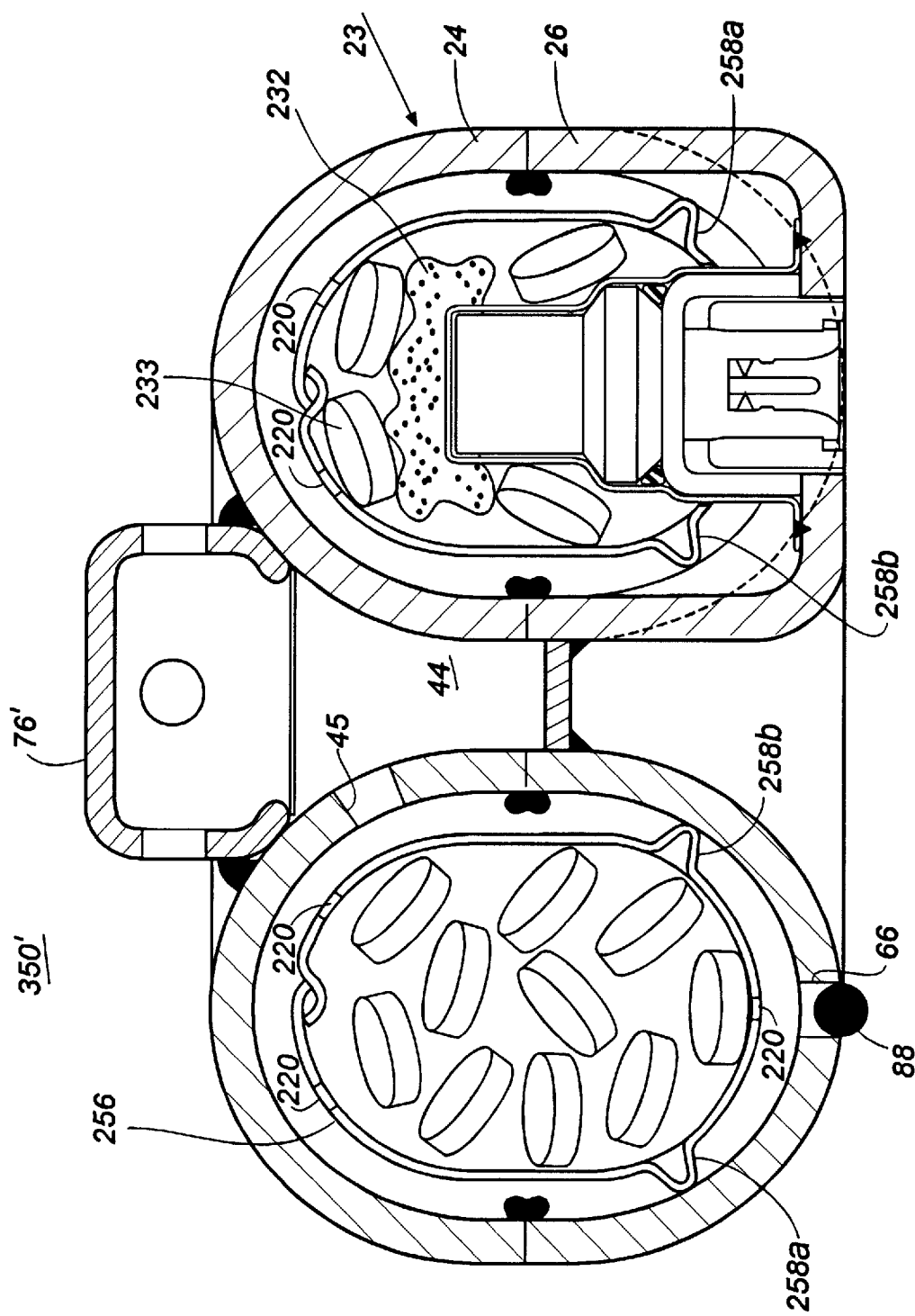

5,851,027

VARIABLE OUTPUT DRIVER SIDE HYBRID INFLATOR

BACKGROUND AND SAY OF THE INVENTION

The present invention generally relates to air bag inflators and more particularly to single level and variable output level hybrid inflators.

U.S. Pat. No. 5,199,740 is illustrative of a single stage driver side hybrid inflator. Upon activation the inflator controls the inflation rate with a generally fixed limit. It has long been recognized that inflators having a variable or at least a dual level output capability such as that used in U.S. Pat. No. 5,341,988 provide certain benefits to tailor the air bag inflation rate to the severity of the accident. The last mentioned patent relates to a dual level passenger side air bag hybrid inflator. With the inception of what is called a smart restraint system having the capability of sensing if the occupant is in the normal seating position or out of position and the capability of sensing the size (weight) of an occupant, inflators that provide a variable output inflation level can be used to their fullest potential to protect the occupant.

It is an object of the present invention to provide a single level and variable output inflator that is of similar size to the conventionally used solid propellant inflators using sodium azide. It is a further object of the invention to utilize metal stamping for most of the major parts of the inflator to provide an inflator that is cost effective.

An advantage of the present invention is that its multi-level output permits the airbag to be inflated at a controllable lower rate in relation to the out-of-position occupant and in relation to the smaller fifth percentile occupant whether out of position or not. It is an added object of the present invention to provide a robust and rugged inflator utilizing the strength of a toroidal pressure vessel supplemented by a centrally located insert such as a tubular manifold and fill assembly. This construction permits the pressure vessel to contain inflation gases at higher pressures for a given wall thickness thus minimizing the weight of the inflator. Another embodiment of the invention relates to a toroidal shaped driver side inflator having a single pyrotechnic assembly. Various other embodiments are shown.

Accordingly the inflator comprises: an inflator for use in inflating an air bag or air cushion comprising: a pressure vessel comprising a thin walled toroidal pressure vessel portion and a cylindrical pressure vessel portion circumscribed by, in physical contact and in fluid communication with the toroidal pressure vessel portion, the cylindrical pressure vessel portion including a rupturable disk and at least one exit port communicable with an air bag; and pyrotechnic means for heating stored inflation gas within the pressure vessel to a pressure level to rupture the rupturable disk.

Many other objects and purposes of the invention will be clear from the following detailed description of the drawings.

BRIEF DESCRIPTION OF THE DRAWINGS

In the drawings:

FIG. 13 illustrates another embodiment of the invention.

DETAILED DESCRIPTION OF THE DRAWINGS

Figure 1:
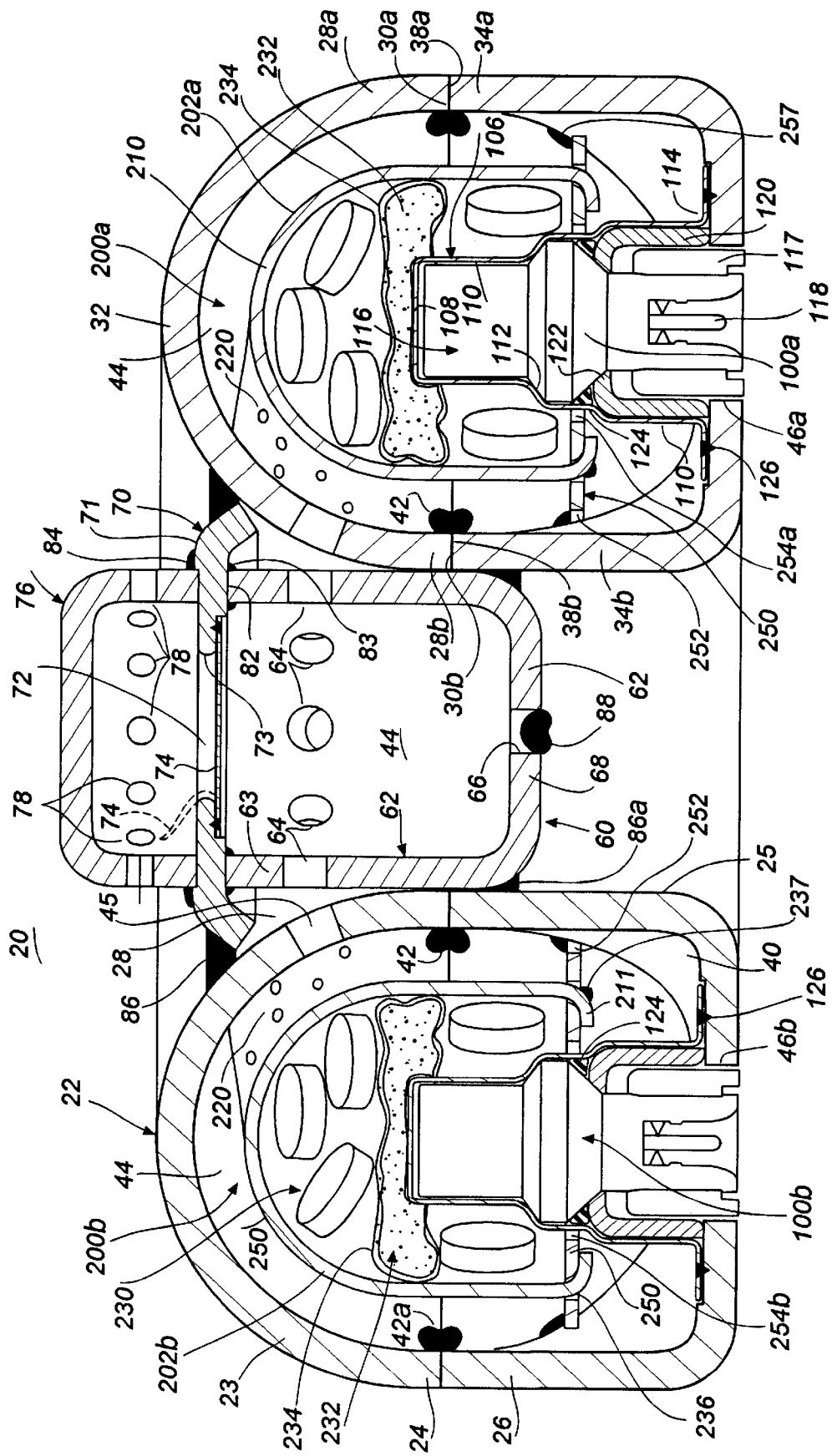
FIG. 1 is a cross-sectional view of a driver side hybrid inflator incorporating the present invention.

Reference is made to FIG. 1 which shows the major elements of a multi-level hybrid inflator 20 capable of inflating a driver side air bag. The inflator 20 includes a pressure vessel 22 comprising toroidal section 23, a second cylindrical section formed by a manifold and fill assembly (MF assembly) 60 and an intermediate pressure vessel section 28. The MF assembly 60 is received within the center opening 25 of the toroidal section 23. The MF assembly 60 and toroidal section 23 communicate with each other through the intermediate pressure vessel portion 28 via a plurality of flow passages as described below. The toroidal section may be formed by a thin, metal (such as steel or lightweight aluminum) stamped upper 24 and lower 26 sections. The upper section 24 includes a top 32, and an outer side 28a and an inner side 28b each terminating at respective ends 30a,b. The upper section 24 also includes a number of flow passages 45 generally evenly spaced about an upper portion of the side 28b. The lower section includes a bottom 40, and sides 34a,b each terminating at respective ends 38a,b, which mate against the ends of the top section. The upper 24 and lower 26 sections are joined together along an inner and outer seam formed at their respective ends by spin friction forming welds 42 and 42a.

Figure 2:
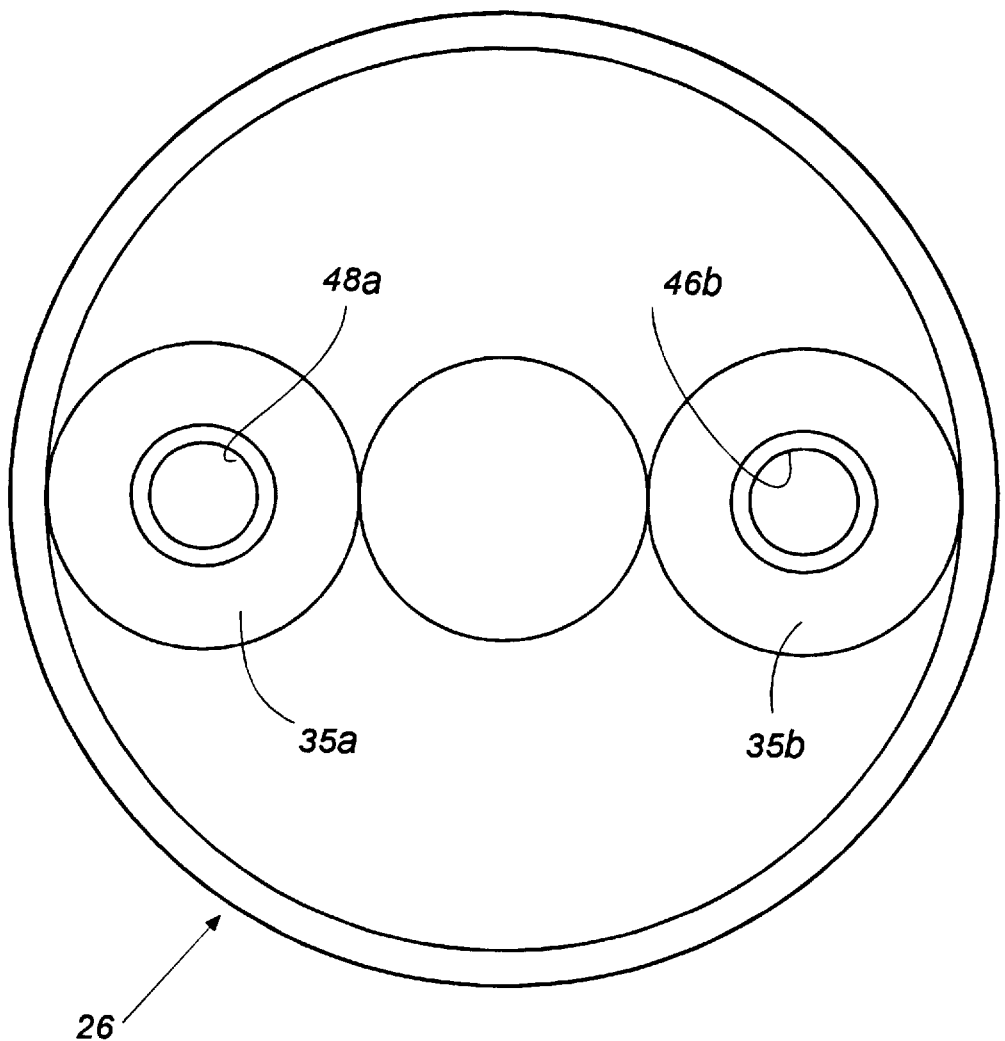
FIGS. 2 through 4 are various views of a lower toroidal pressure vessel portion.
Figure 3:
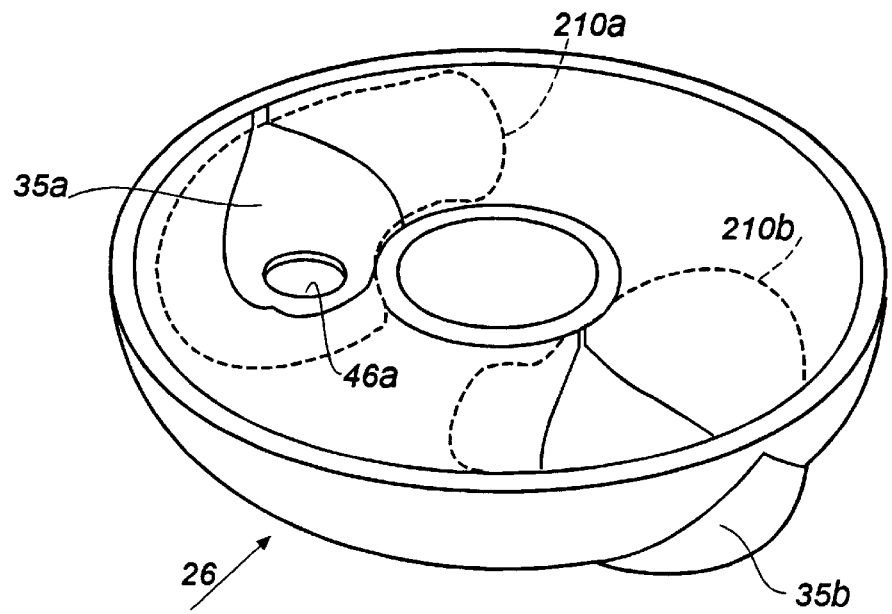
Figure 4:
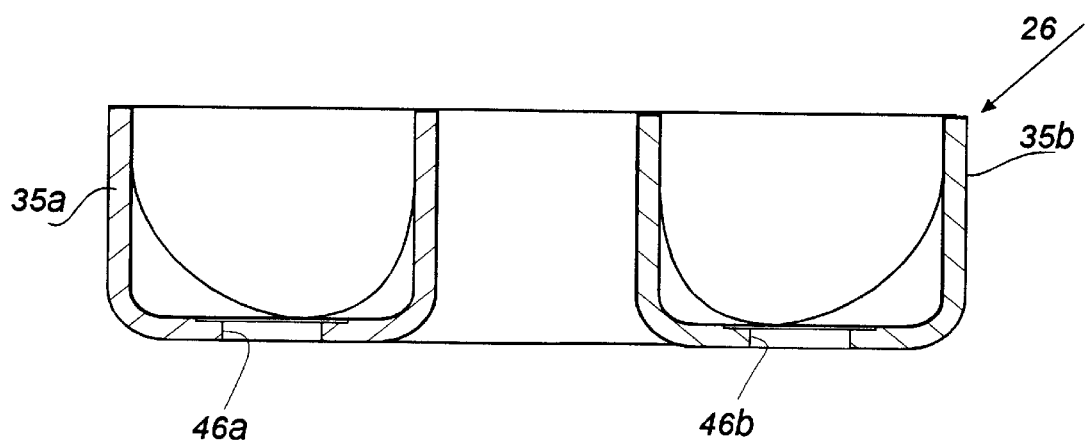

Reference is briefly made to FIGS. 2–4. The lower section 26 also includes two stamped, extending, hollow, cylindrical bosses 35a,b each boss having respective openings 46a or 46b through which a part of a respective initiator assembly 100a,b extends (see FIG. 1).

Figure 5:
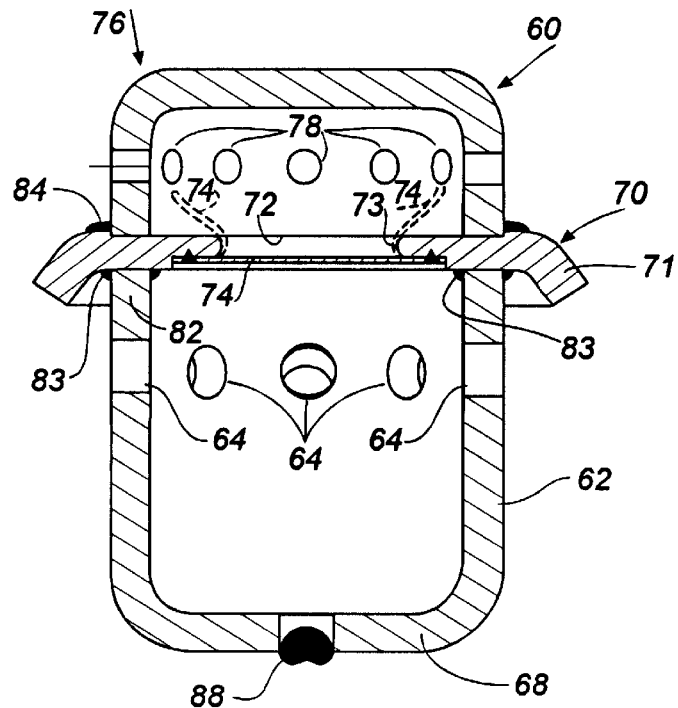
FIG. 5 is an isolated view of a manifold and fill (MF) assembly.

The MF assembly 60, also shown in FIG. 5, comprises a central, drawn, metal tube 62 having a plurality of gas flow openings 64 in the tube's side 63 and a fill port 66 in the tube's bottom 68. After the pressure vessel is filled, the fill port 68 is welded shut. The assembly 60 also includes an annular rupture disk support 70, comprising a bent disk 71, having a central opening 72 upon which is laser welded a thin, Inconel 600 alloy rupture disk 74 and a metal, preferably steel cup-shaped manifold 76 having a plurality of exit passages 78. The shape of the support 70 proximate the opening 72 is rounded, see numeral 73. The benefit of this construction is that as the disk 74 is ruptured the various, now ruptured or segmented parts of the disk 74 (see phantom lined disk part 74) are pushed up by the exiting pressurized inflation gas and roll about the circular end 73 which prevents the fracture of the relative brittle rupture disk 74 material.

The rupture disk support 70, with the rupture disk welded in place, is then friction welded to the top 82 of the tube 62. This weld is shown as 83 and is more clearly seen in FIG. 5. Thereafter, the cup shaped manifold 76 is arc-welded, see weld 84, to the rupture disk support 70. After the MF assembly 60 is assembled it is slid within the central toroidal opening 25 and the edge of the rupture disk support 70 is welded, see circumferential welds 86 and 86a (see FIG. 1), to the upper PV section 24 and lower PV (pressure vessel) section 26 (after the upper 24 and lower 26 PV sections have been joined). As can be seen, the openings 64 of the central tube 62 are generally opposite the set of openings 45 in the upper PV section 24. Inflation gas comprising an inert gas such as argon or an argon/helium mixture is introduced into the inflator's pressure chamber 44 through the fill port 66 in a known manner and thereafter the fill port is sealed by resistance welding a steel ball 88 therein. As can be appreciated the sealed volume within the toroidal section 23, the MF assembly 60 and the intermediate chamber 28 between the upper PV section 24 and the MF assembly 60 form the inflator's pressure vessel or pressure chamber 44.

To achieve the variable level inflation rate capability the inflator 20 includes two unique pyrotechnic devices 200a,b. These pyrotechnic devices 200a,b include respective initiator assemblies 100a,b and pyrotechnic capsule assemblies 202a,b that are respectively fitted about an initiator assembly. These capsule assemblies provide a means for packaging and retaining generant (propellant) about each initiator 116a,b to facilitate ignition and also function as independent combustion chambers that can operate at slightly higher pressures than the pressure vessel.

Figure 6:
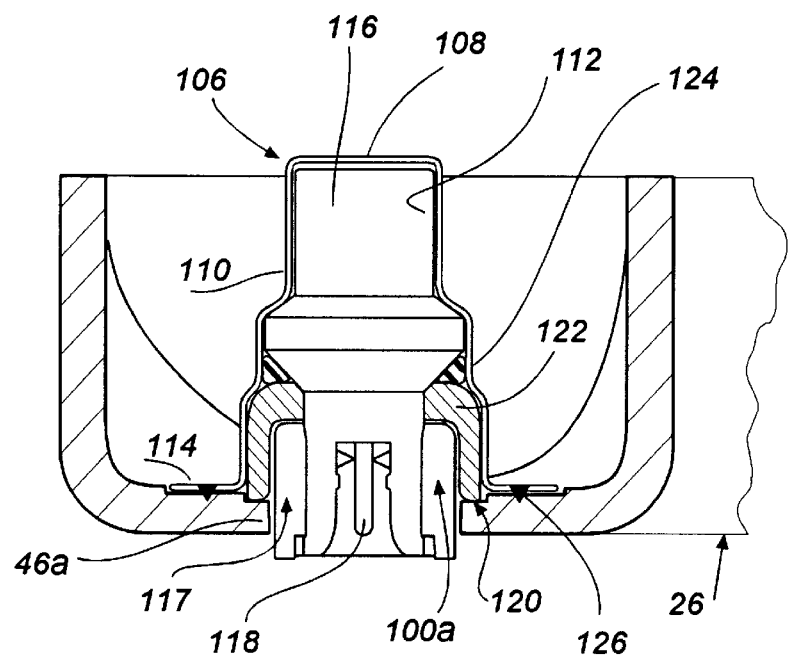
FIG. 6 is a partial cross-sectional view showing an initiator assembly within a lower section of a toroidal pressure vessel.
Figure 8:
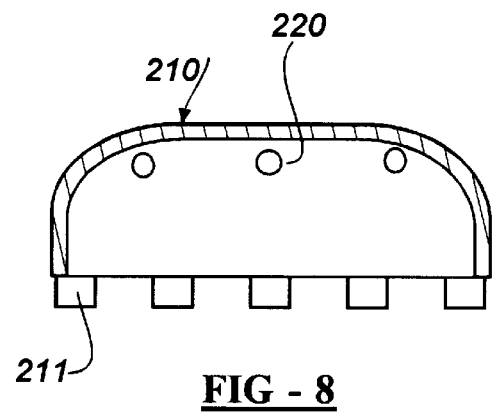
FIG. 8 is a cross-sectional view of a pyrotechnic capsule assembly cap.
Figure 7:
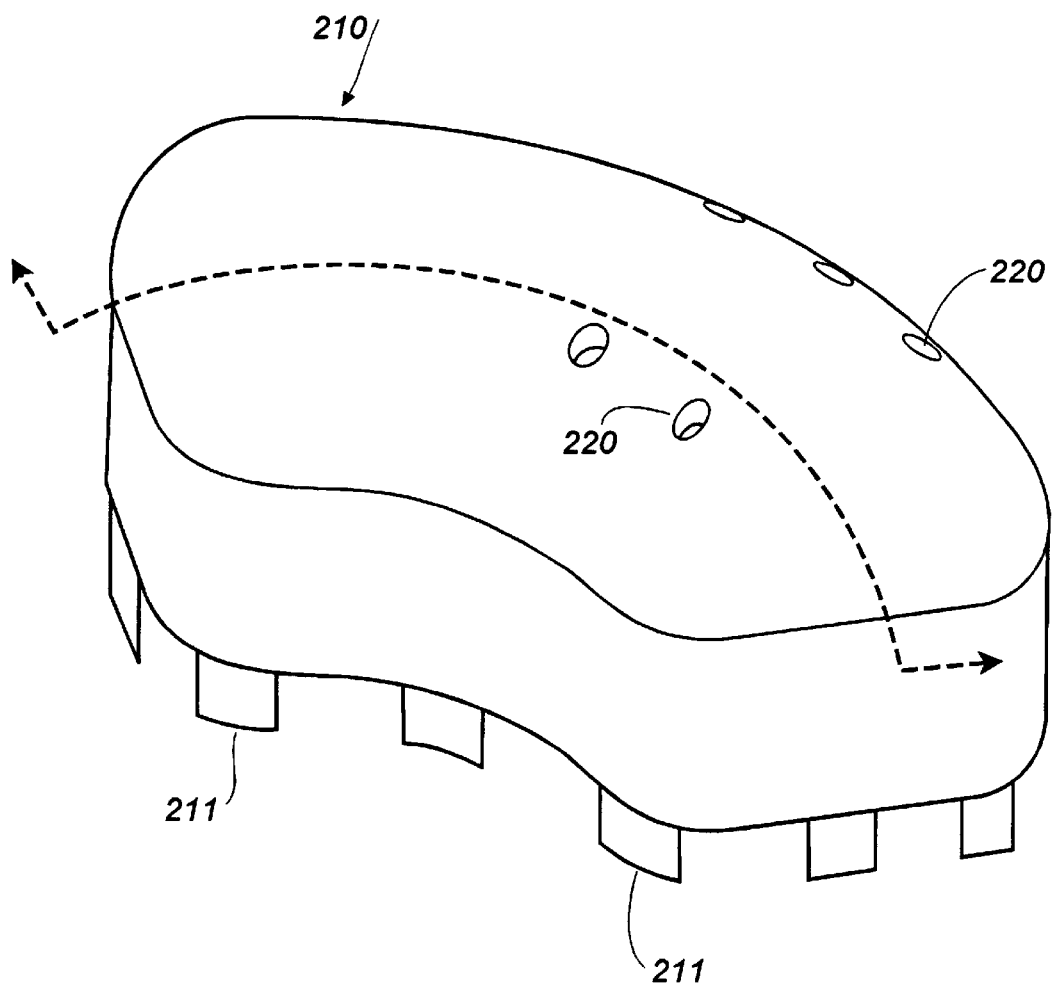
FIG. 7 is an isolated view of a propellant capsule cap.
Figure 9:
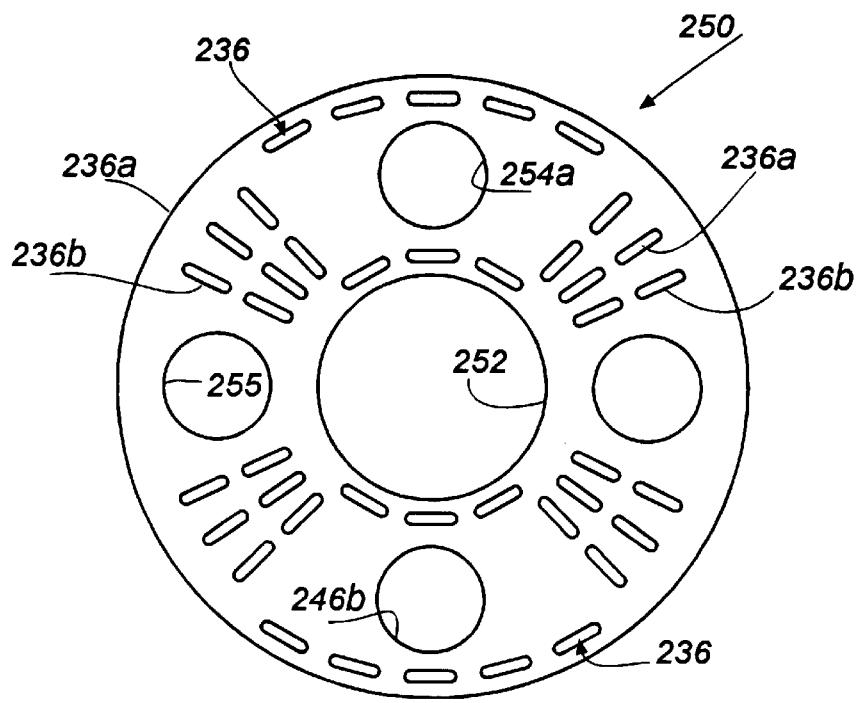
FIG. 9 is a plan view of a propellant capsule plate.

It should be appreciated that if a single level inflator were desired only one pyrotechnic device 200a or 200b would be used. Prior to assembling the upper and lower toroidal sections 24 and 26 one or more initiator assemblies 100a,b are assembled and installed within the lower section 26. The preferred embodiment of the invention uses two pyrotechnic initiator assemblies 100a,b which are capable of being independently ignited (by an electric control unit, not shown) to initiate combustion in each generant chamber to separately heat the inflation gas and hence vary the inflation level of the air bag. Reference is made to FIGS. 1 and 6 which show the details of a pyrotechnic initiator assembly 100a. The other assembly 100b is identical to the initiator assembly 100a.

Each initiator assembly 100a. comprises a thin, stainless steel sleeve 106 having a closed top 108 and side wall 110 defining a multi-stepped bore 112 therein. A circular flange 114 extends about an end of the side wall 110. The bore 112 is sized to closely receive an initiator 116 (detonator or squib as it is often called in the art) of known construction. The initiator includes a plurality of electrical terminals 118, communicated to an electric control unit (ECU) which generates one or more control signals to ignite one or the other or both initiators 116 upon sensing a crash of a determinable magnitude. Each initiator 116 is supported within its sleeve 106 by an annular support 120 having a curved top 122 butted against the initiator 116. More particularly, the end 122 is chamfered and abuts a sloped side of the initiator 116. The annular support 120 functions to transfer any pressure or reaction load from the initiator 116 directly to the lower section 26 preventing the initiator 116 from being pushed out of the lower section 26. An O-ring 124 provides a pressure seal between the sleeve 106 and the initiator 116 to prevent leakage after the sleeve 106 has been opened during operation of the initiator 116. Each sleeve 106 is laser welded upon the lower toroidal section 26 about a respective opening 46a or 46b forming a seal. The weld is generally shown as 126. The initiator is centered with respect to the opening 46a or 46b via the shorting clip assembly 117 The shorting clip assembly 117 is a plastic part with an insert molded electrical contact bar to shunt the pins 118 of the initiator 116 during the time that a mating electrical connector is not installed.

Each pyrotechnic capsule 202a,b, shown in

FIGS. 1, 7, 8, and 9, comprises a formed, metal, kidney-shaped cap 210 and a bottom element 250. The cap 210 includes a plurality of extending tabs 211 (see FIG. 7) and a series of small openings 220 that allow controlled venting of generant gases to the inflator chamber 44 to mix with and heat the argon/helium gas mixture. A first amount of slow burning generant 230 (see FIG. 1) such as a plurality of individual pellets is placed within the chamber 210. A quantity of finer, fast burning generant 232 is placed within the cap 210 in proximity to the initiator 116. This generant 232 can be a powdered, pulverized or small granular form of the slow burning propellant 230 and contained within a thin, closed envelope 234 formed for example of polyethylene, polypropylene, paper or metal foil. The pyrotechnic capsules 202a,b can be filled with the same amount or different amounts of generant 230 to establish the desired burn rates and hence the desired inflation rate(s) for the air bag. After an initiator 116 is activated, the fast burning generant 232 quickly burns generating hot gas which ignites the pelletized, slow burning generant 230. Reference is briefly made to FIG. 3 which shows the position of each capsule cap 210, in phantom line, relative to the lower toroidal section 26.

While each cap 210 can be joined to a separate bottom structure and then placed properly in the pressure vessel 23; the present invention uses a thin annular plate 250 (see FIG. 9) which serves as a convenient means to properly locate and hold one or both caps 210. The plate 250 has a center opening 252 and opposing openings 254a,b located so that when the plate 250 is in position within the lower toroidal section 26 the initiators 116a,b extend therethrough. If only one initiator 116 is used the plate 250 could have one opening such as 254a. The plate may also include a plurality of auxiliary openings or removed sections 255 to reduce its weight and permit gas flow thereacross. The central opening 252 is slightly larger than the diameter across the inner side 34b of the lower toroidal section 26 to enable the plate 250 to be matingly engaged with the lower section 26. The plate additionally includes two sets of tab receiving openings 236 to receive the tabs from each cap 210. Additional openings such as 236a, 236b are provided in the plate 240 to accommodate longer caps 210.

During assembly, each cap 210 may be placed upside down in an assembly fixture. The pellets of generant 230 are first loosely placed into the inverted cap(s) 210. An envelope 234 of fast burning propellant 232 is placed within each cap 210. Thereafter the plate 250 is placed atop the inverted caps 210 with the tabs 211 extending through the tab receiving openings 236. The tabs are folded over to secure the caps 210 to the plate 250 and optionally welded (see weld 237 as shown in FIG. 1) to the bottom side of the plate 250. With the caps 210 and plate 250 in the above described position, the lower toroidal section 26 is inserted upon the plate 250 with its inner side 34b extending into the central plate opening 252 and the initiator sleeves 106a,b extending into a respective opening 254a,b. The plate 250 is welded to the inside of the section 26. These welds are shown as 257. Alternatively, the plate 250 with the caps 210 in place can be turned right-side-up and installed within an upright lower section 26. The upper toroidal section 24 is mated to the lower section 26 and friction welded thereto completing the toroidal pressure vessel. The MF assembly 60 is lowered into the center hole 25 and welded thereto (see welds 86 and 86a). The inflator 20 is then filled with inflation gas as described above.

The operation of the above described inflator 20 is as follows: Upon sensing a collision the electronic control unit, after receipt of a signal from one or more crash sensors, determines the magnitude of the crash, occupant seating position and/or size and generates one or two signals to ignite one initiator 116a or both initiators 116a,b. Assume for the sake of discussion that capsule assembly 202a contains less propellant than capsule assembly 202b.

The type of inflator described above offers the safety restraint designer a full range of operating capabilities. Either initiator 116a or 116b can be ignited individually or simultaneously or in a timed sequence depending on the severity of the accident and occupant data. In a low magnitude accident only initiator 116a might be ignited. If a mid-level crash were detected initiator 116b having a greater amount of propellant could be ignited. Both initiators 116a,b can be simultaneously ignited in a very severe accident or both initiators ignited with a time differential during any level accident. Upon ignition of either initiator 116a,b the heated gases and flame produced within rupture through the top 108 of its sleeve 106 to ignite the fast burning generant 232 in the envelope 234 causing this generant 232 to burn intensely. The products of combustion produced by this burning generant 232 flow about and cause the pellets of slow burning generant 230 to burn. The products of combustion resulting from this burning propellant 230 begin to heat any stored inflation gas within the cap 210 and flow through the openings 220 heating the inflation gas (argon) within the pressure chamber 44 of the pressure vessel 22. The pressure of the stored inflation gas continues to increase until it reaches a level sufficient to cause the rupture disk 74 to break at which time heated inflation gas exits the inflator 20 and enters the adjacent air bag filling the air bag at a determinable first inflation rate. The ignition of the second initiator will further heat any remaining stored inflation gas causing the inflation gas to exit the inflator and fill the air bag at an increased inflation rate and level.

As can be seen from the above one advantage of using the oval or kidney-shaped capsule assembly cap 210 is that the main charge of propellant 230 is positioned such that the required volume is minimized permitting the cap 210 and the height of the toroidal pressure vessel to be reduced.

Figure 10:
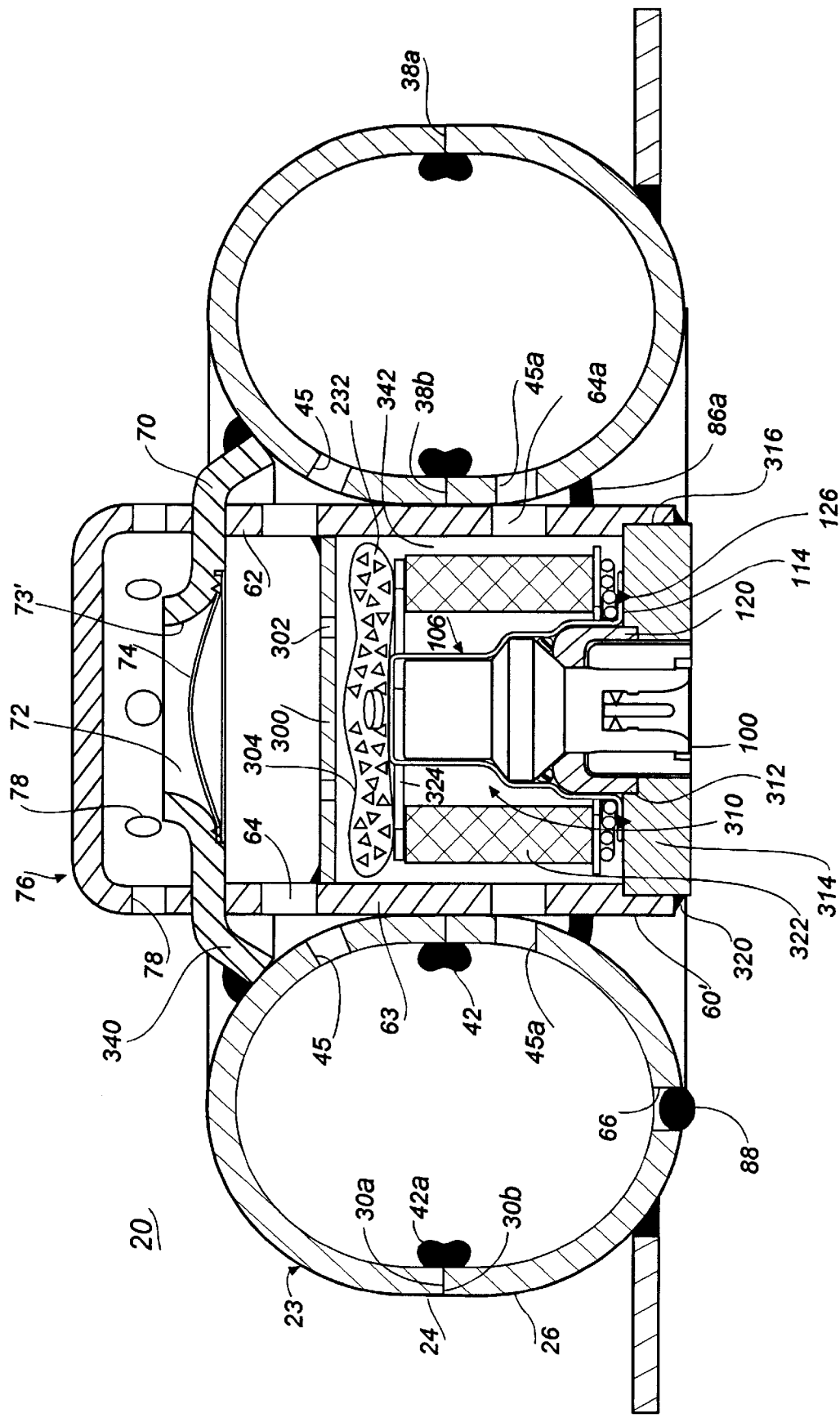
FIG. 10 shows an alternate embodiment of the invention.

Reference is made to FIG. 10 which illustrates an alternate driver side hybrid inflator 20'. This inflator includes a toroidal section 23 in which the upper 24 and lower 26 toroidal half sections are joined along the seams defined by the section ends 30a, 30b and 38a and 38b defining the inner seam weld 42 and an outer seam weld 42a. The upper section 24 includes a first plurality of flow passages 45 and the lower section 26 includes another plurality of flow sections 45a. Positioned within the central opening 25 between the inner walls of the toroidal section 23 is a cylindrical tube 60' having walls 63. The tube 60' includes a first plurality of openings 64, similar to those shown in FIG. 1 and a second plurality of lower placed, openings 64a. With the tube 60' in place openings 64 are generally opposite openings 45, and openings 64a are preferably opposite openings 45a. Situated just below the series of openings 64 is a separator disk 300 having a plurality of openings 302 therein. Situated within a pressure chamber 304 formed by the disk 300 and side walls 63 is an energetic or pyrotechnic capsule generally shown as 310. This capsule comprises an initiator assembly such as 100 which is structurally identical to that shown in FIG. 1 having the sleeve 106, initiator 116 and support 120. The lower end of support 120 is fitted within an annular groove 312 in a lower plate 314 that is received within a groove 316 in the side walls 63. The flange 114 of the sleeve 106 is welded to the plate 314. Such welds are shown as 126. The plate 314 is welded to the walls 63, such weld being shown as 320. The mass of the plate 312 functions as a heat sink to keep heat away from the initiator 116 and propellant. Positioned within the chamber 304 is a hollow cylinder of generant 322. The generant is stabilized or centered relative to the sleeve 106 by a washer 324.

Situated above the tube 60' is a manifold 76 having a plurality of exit openings or orifices 78. The manifold 76 supports a rupture disk support 70 which in turn supports a thin burst disk 74 welded thereto. The support includes smoothly curved walls 73' proximate its center opening 72 about which the various parts of the broken disk roll about after the disk 74 is ruptured. The disk 74 is shown bowed in the position it would take when biased by the pressurized inflation gas. The manifold 76 is welded into the top of the manifold support 70 and an annular, downwardly extending edge 340 of the manifold support 70 is welded to the upper toroidal section 24, fixing the manifold 76 and tube 60' thereto. The tube 60' is also welded at 86a to the lower toroidal section 26.

As can be seen in FIG. 10 the generant 322 is slightly spaced, see space 342 from the sides 63, permitting inflation gas to completely envelop the generant. This alternate embodiment may include a quantity of fast burning propellant 232. The lower toroidal chamber 26 includes a fill port or passage 66 sealed by a steel ball 88 resistance welded thereto. Upon filling the inflator 20' with inflation gas such as argon or a combination of argon and helium, the inflation gas fills the toroidal section, the chamber 304 as well as the chamber or volume between the plate 300 and the burst disk 74.

After the initiator 116 is activated it produces products of combustion which pressurize and rupture through the top 108 of the sleeve 106 and immediately ignite the pyrotechnic charge 232, which subsequently ignites the generant 322 to heat the inflation gas within chamber 304. Some of the products of combustion pass through the small openings 302 in the plate 300 and act upon the burst disk 74 quickly opening same. As the generant 322 continues to burn a portion of the heated inflation gas continues to flow through the openings 302 to the opened burst disk providing a relatively immediate source of inflation gas to begin inflating the air bag. The products of combustion produced by the burning generant also flow through the larger openings 64a and 45a into the lower portions of the toroidal section 23 to heat the inflation gas remaining within this section. The heated inflation gas exits the inflator through the openings 45, 64 and 78.

Figure 12:
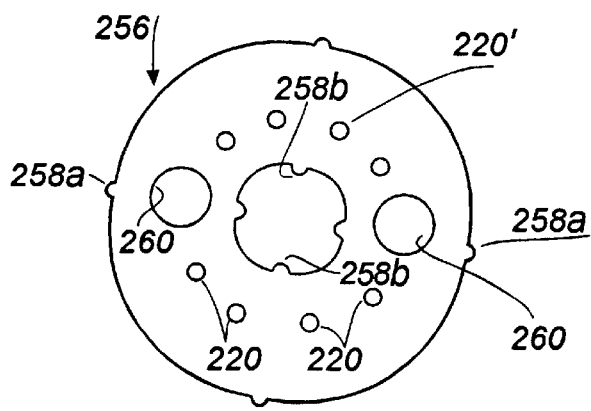
FIGS. 11 and 12 show a further alternate embodiment of the invention.
Figure 11:
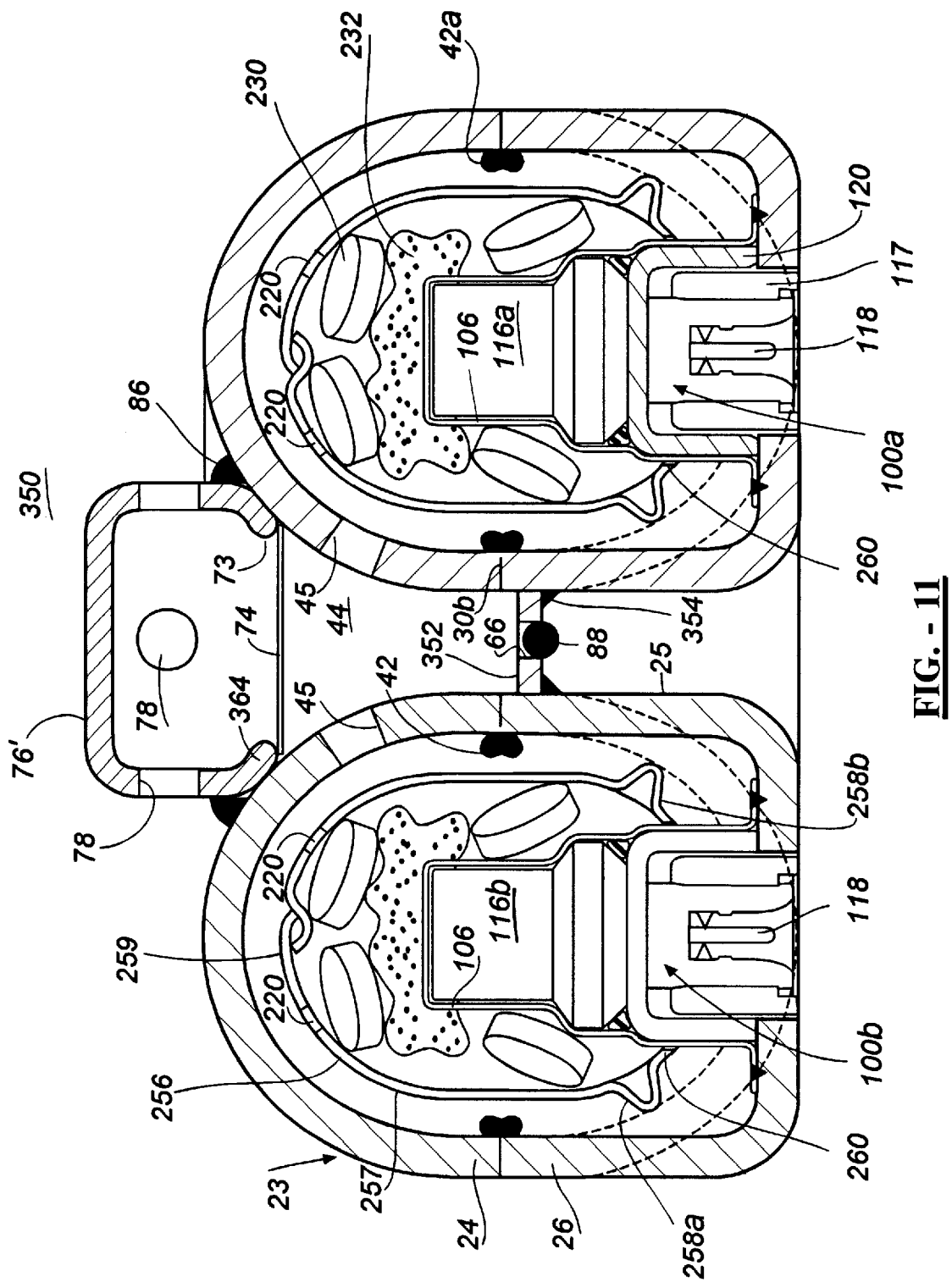

Reference is now made to FIGS. 11 and 12 which show another alternative toroidally shaped inflator 350 having a construction similar to that of the inflator 20 shown in FIG. 1, however, the cylindrically shaped MF assembly 60 is missing and replaced by a washer-like insert (short cylinder) 352. The insert 352 is welded to the inner wall of the toroid 23 at its center opening 25, such a weld being shown as 354. The insert 352 includes a fill hole 66 which is sealed by a welded object such as the steel ball 88. The insert 352 is welded to the lower toroid section 26 just below its inner ends 30b. As can be appreciated the insert will also function to reinforce the inner walls of the joined toroidal sections 24 and 26. The elimination of the MF assembly 60 and substitution of the insert 352 permit this type of inflator to be narrower and lighter weight than the inflator 20. Inflator 350 differs from inflator 20 in that caps 210 and plate 250 shown in FIG. 1 are replaced with a toroidally shaped frame or basket 236, having a generally oval cross-section to comport with the general shape of the inflator 350 as a means for retaining the propellant tablets 230. The frame or basket 236 may be formed as an integral part from a stamped, thin metal plate. In the illustrated embodiment the frame 256, near the lower end of its sides 257 includes a plurality of stand-offs 258a,b which engage the bottom of the lower toroidal section 26 to properly position the frame and propellant 230 relative to the initiators 116. The stand-offs 258a,b provide a point contact of the propellant frame 256 to the lower toroidal portion 26 lessening heat transfer to the propellant during the welding of the adjacent part. The frame 256 also includes holes 260 in its bottom to receive an initiator 116. The frame 256 may also include a plurality of openings such as 220 in its top and another plurality of openings in its bottom 220' (see FIG. 12, a plan bottom view of the frame 256) through which the products of combustion flow into the toroidal section 23. The sides 257 of the frame 256 are joined generally at its top 259. The manifold 76' of this inflator 350 is cup-shaped and includes ports 78 in its sides. The ends 364 of the sides 362 of the manifold 76' are bent inwardly and are smoothly and radially curved (at 73) and a burst disk 74 is welded thereto. Upon rupture, the disk 74 rolls about the ends 364. The manifold 76' is welded to the upper toroidal section 24 at welds 86. The operation of this inflator is virtually the same as the earlier inflators 20, 20' in that upon activation of one or both of the initiators 116 the products of combustion heat the stored inflation gas at a first or second rate raising the pressure with the inflator 350 until the burst disk 74 ruptures, permitting heated inflation gas to enter into a closely spaced air bag. The heated inflation gas within the inflator bears against the disk 74 opening same at a designed pressure.

The inflator 350' shown is FIG. 13 is of similar construction to inflator 350 but is using a single initiator 116. The slow burning propellant tablets 230 are distributed throughout the propellant frame 256. It should be noted that the upper toroidal section 24 does not include openings 45 running entirely about the upper section 24 (as is the case with inflator 350) adjacent the initiator 116. An opening or openings 45 are, however, provided in the upper toroidal section 24 generally opposite the single initiator 116. Upon igniting the initiator 116 the production of combustion produced upon the burning of the fast burning propellant 232 located generally above the initiator cause the slower burning tablets 230 to burn. This burning of the tablets 230 proceeds in a clockwise and counter clockwise manner from the initiator, about the inside of the toroid 23, to the opening(s) 45. The products of combustion heat the stored inflation gas located about the frame 256 raising the pressure within the inflator 350'. The heated inflation gas and the products of combustion exit the opening(s) 45 into the center of the pressure vessel 44 causing the disk 74 to rupture. The openings 220 and 220' may generally be clustered on the frame 256 opposite the position of the initiator 116.

Figure 14:
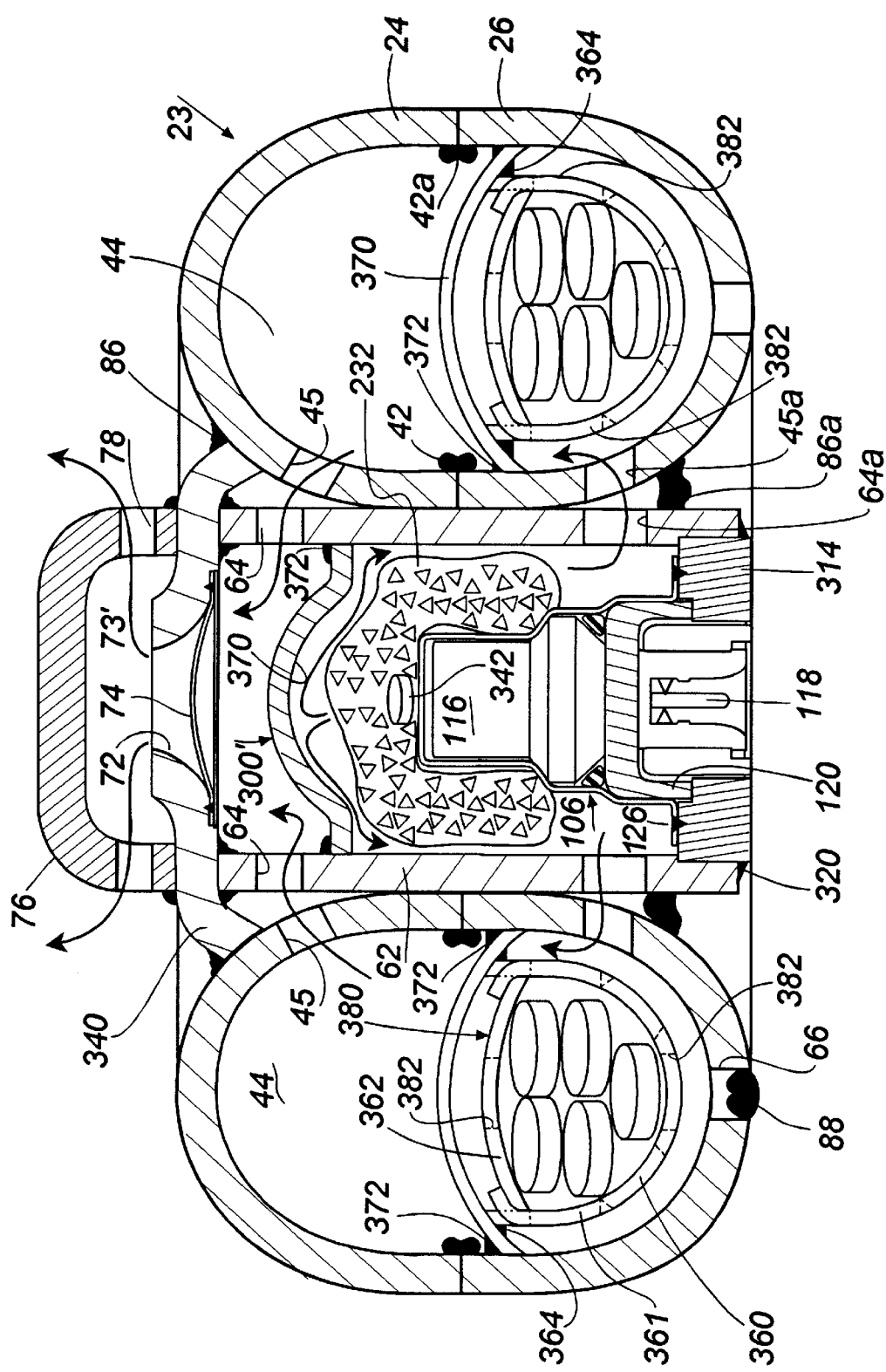
FIG. 14 illustrates still another embodiment of the invention.

FIG. 14 shows another embodiment of the invention and is rather similar to the inflator shown in FIG. 10 with the exception that the initiator 116 is isolated from the generant capsules 230. A fast burning quantity of propellant 232 is similarly located proximate the initiator 116 and may optionally contain an auto-ignition device 342 (which can be used in any of the other embodiments as well) which will automatically ignite if the temperature of the inflator exceeds a predetermined temperature thereby auto-igniting the inflator. The tablets 230 are housed within a propellant frame 360 which suspends the tablets 230 from the lower toroidal section 26. The frame 360 includes a curbed, annular disk 370 that is welded at locations 372 to the lower toroidal portion 26. A toroidal shaped generant frame or basket 380 is suspended from the disk 370. The basket 380 includes a lower portion 360 attached to the disk 370 such as welding at 364 and a top portion 362 attached to the lower portion 360. The capsules of slow burning propellant are housed within the basket 380. Both the upper 362 and lower 360 portions of the basket 380 include openings 382 through which the products of combustion of the burning capsules (propellant) flow into the toroidal pressure vessel portion 23 and heat the inflation gas stored therein.

An additional difference between this inflator and the one of FIG. 10 is that the separator disk 300' is solid and arcuately shaped. Upon ignition of the initiator 116, which is housed in the center tube section 62, the gas produced and other products of combustion impinge upon the underside of the separator 300' and are diverted downwardly and flow through the openings 45a and 64a heating the slow burning propellant 230 causing same to burn heating the stored inflator gas within the pressure chamber 44. Upon breaking of the disk 74 the products of combustion and heated inflator gas exit the openings 45, 64 72 and 78 to inflate a closely spaced air bag. The separator 300' is welded about tube 62 below the openings 64.

Many changes and modifications in the above described embodiment of the invention can, of course, be carried out without departing from the scope thereof. Accordingly, that scope is intended to be limited only by the scope of the appended claims.

We claim:

1. An inflator device (20) for use in inflating an air bag or air cushion comprising:

a pressure vessel (22) defining an enclosed volume (44) containing stored inflation gas, said pressure vessel comprising a toroidal pressure vessel portion (23) having circular inner wall and outer wall portions, the inner wall portions defining an annular space (25), and reinforcing means (60, 62, 60') secured to at least an exterior of the inner wall portion about the annular space for reinforcing the pressure vessel in relation to internal pressure forces;

pyrotechnic means (200a,b or 310) in said toroidal pressure vessel portion for heating said stored inflation gas within the pressure vessel to a pressure level to open a rupturable disk to permit said stored inflation gas to exit the inflator device.

2. The device as defined in claim 1 wherein the reinforcing means includes a cylindrical pressure vessel portion (60, 60') circumscribed by, in physical contact with, in fluid communication with and forming part of the toroidal pressure vessel portion, the cylindrical pressure vessel portion including the rupturable disk (74) and at least one exit port (78) communicable with an air bag.

3. The device as defined in claim 1 wherein the reinforcing means includes a circular member (352) secured to the pressure vessel portion, circumscribed by the inner wall portion.

4. The device as defined in claim 3 wherein the circular member is formed in the shape of a short cylinder having a center fill port (354) into which inflation gas is received.

5. The device as defined in claim 2 wherein the cylindrical pressure vessel portion comprises a cylindrical tube (62) having a wall (63) secured to an outside of said inner wall portion of the toroidal pressure vessel and an open top (82), a rupture disk support member (70) with a central opening (72), wherein the rupturable disk is secured to the support member to seal the central opening (72) and wherein an outer edge of the support member (70) is secured to the toroidal pressure vessel portion (22), the support member, the exterior of the toroidal pressure vessel portion and the exterior of the cylindrical pressure vessel portion (60) defining an intermediate annular pressure vessel portion (28).

6. The device as defined in claim 5 wherein a portion of the support structure which surrounds the central opening (72) is smoothly curved to receive a portion of the rupturable disk subsequent to rupture.

7. The device as defined in claim 5 wherein the toroidal pressure vessel portion and the cylindrical pressure vessel portion each respectively include at least one flow opening (45,64) in communication with the intermediate annular pressure vessel portion (28).

8. The device as defined in claim 1 wherein the toroidal pressure vessel portion (22) comprises an upper (24) and lower (26) half toroidal section joined together along an inner seam (30b, 38b) and an outer seam (30a, 38a) forming the toroidal pressure vessel portion (23) and wherein the cylindrical pressure vessel portion (60) abuts the inner seam.

9. The device as defined in claim 1 wherein the toroidal pressure vessel portion (23) includes at least one outwardly extending boss (35a,b) having a generally flat bottom (40) with a respective initiator opening (46) therein.

10. The device as defined in claim 9 including an initiator assembly (100a,b) associated with each initiator opening (46a,b) comprising:

a sleeve (106) having a closed end (108) extending into the toroidal pressure vessel portion (23) and another end (114) sealed to the toroidal pressure vessel portion about the initiator opening (46a,b);

initiator means for generating products of combustion for rupturing a portion of the closed end of the sleeve (106) in response to a received control signal;

initiator support means (120) located within the sleeve (106) in abutting relationship with the initiator means and the toroidal pressure vessel portion for supporting the initiator means and for transferring any forces acting in the initiator means directly to the toroidal pressure vessel portion.

11. The device as defined in claim 1 wherein the pyrotechnic means (200a,b) includes an initiator (116a,b) positioned in the toroidal pressure vessel portion (23) and a pyrotechnic capsule (202) having a cap (210) and bottom (250).

12. The device as defined in claim 10 further comprising a quantity of slow burning propellant material and a quantity of rapidly burning material positioned to be ignited by the initiator.

13. The device as defined in claim 12 wherein the inflator includes two remotely located initiators and two corresponding pyrotechnic capsules.

14. The device as defined in claim 2 further comprising a rupture disk support element having an exterior edge attached to the toroidal pressure vessel portion.

15. The device as defined in claim 1 wherein the toroidal pressure vessel portion contains a set of holes proximate the rupturable disk and also located generally opposite an initiator (116).

16. The device as defined in claim 1 wherein a separator (300,300') is provided between the pyrotechnic means and the rupturable disk.

17. The device as defined in claim 16 wherein the separator (300,300') is concave upwardly shaped to divert products of combustion generated by an initiator and a fast burning propellant downwardly to flow passages located near the bottom of the cylindrical pressure vessel portion to a quantity of slow burning propellant located within the toroidal pressure vessel portion.

18. An inflator device (20) for use in inflating an air bag or air cushion comprising:

a pressure vessel (22) comprising a toroidal pressure vessel portion (23)

pyrotechnic means (200a,b) disposed within the toroidal pressure portion, for heating stored inflation gas within the pressure vessel for delivery to an air bag.

19. The device as defined in claim 18 further comprising a cylindrical pressure vessel portion (60) circumscribed by, in physical contact and in fluid communication with the toroidal pressure vessel portion, the cylindrical pressure vessel portion including a rupturable disk (74), and at least one exit port (78) communicable with the air bag.

* * * * *